United States Patent [19]

Berry

[11] Patent Number: 4,666,107
[45] Date of Patent: May 19, 1987

[54] DEPLOYABLE SPACE PANEL STRUCTURE

[75] Inventor: Thomas G. Berry, Rohrersville, Md.

[73] Assignee: Fairchild Industries, Inc., Chantilly, Va.

[21] Appl. No.: 582,815

[22] Filed: Feb. 23, 1984

[51] Int. Cl.[4] .............................................. B64G 1/44
[52] U.S. Cl. ................................ 244/173; 244/158 R; 136/292
[58] Field of Search ............................ 244/158 R, 173; 136/292, 245; 52/71, 108

[56] References Cited

U.S. PATENT DOCUMENTS

| | | | |
|---|---|---|---|
| 3,460,992 | 8/1969 | Avilov et al. | 136/292 |
| 3,531,851 | 10/1970 | Douglas | 52/71 |
| 3,698,958 | 10/1972 | Williamson et al. | 136/292 |
| 3,783,029 | 1/1974 | Dillard et al. | 136/245 |
| 4,030,102 | 6/1977 | Kaplan et al. | 244/173 |
| 4,408,430 | 10/1983 | Wangler et al. | 52/71 |

Primary Examiner—Trygve M. Blix
Assistant Examiner—Rodney Corl
Attorney, Agent, or Firm—Michael W. York

[57] ABSTRACT

A deployable space panel structure for use in connection with space vehicles such as satellites and the like. The deployable space panel structure includes a first series of interconnected substantially flat panel members and a second series of interconnected substantially flat members. Pivotal connectors that allow substantially free rotational movement interconnect the edges of certain of the flat panel members of the first and second series of interconnected panel members and a deployment mechanism is provided that permit the first series of interconnected panel members to be in a separate plane from the second series of interconnected panel members. This permits the first and second series of interconnected panel members to have greater strength and rigidity than if they were both located in the same plane.

12 Claims, 10 Drawing Figures

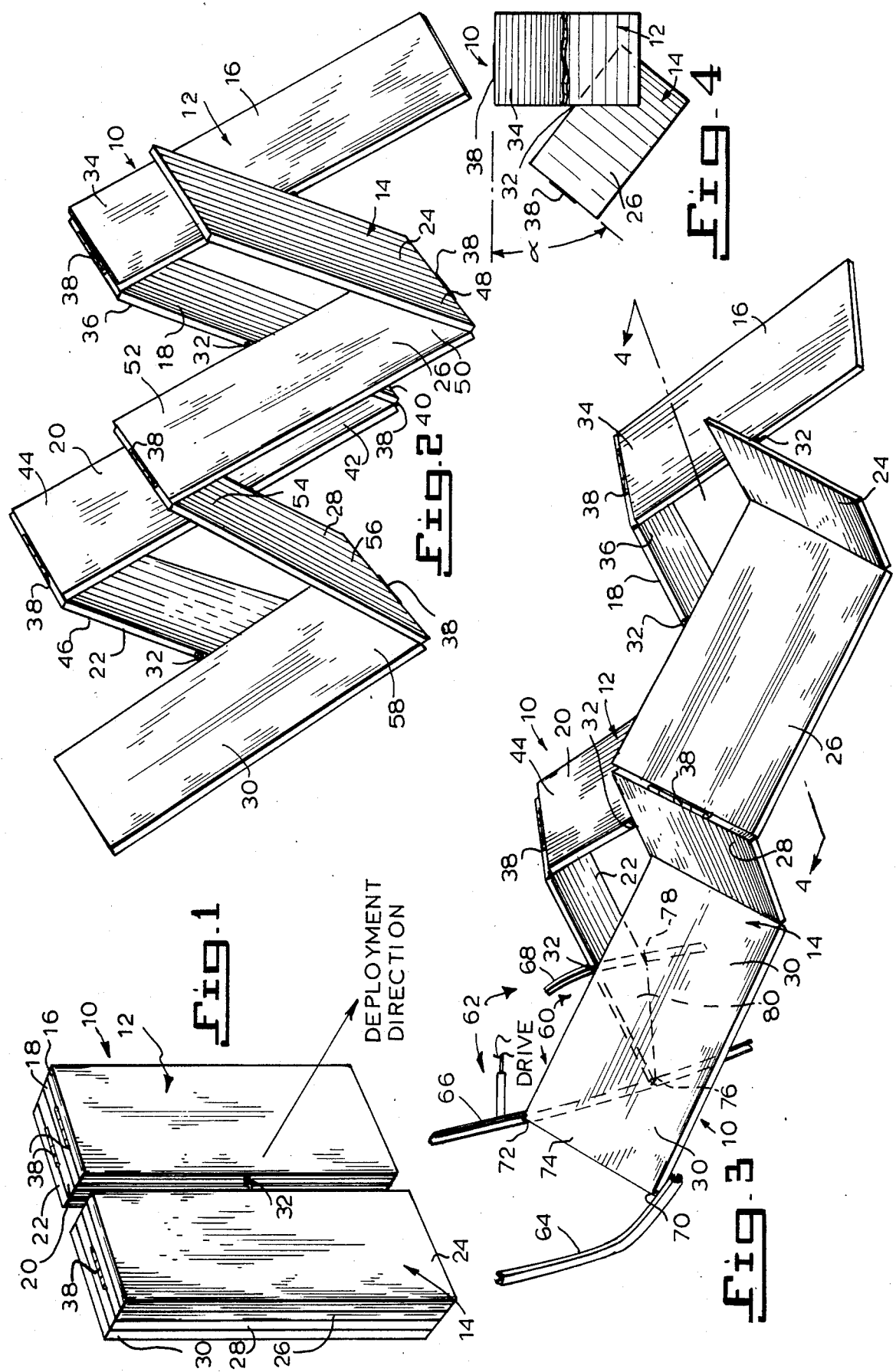

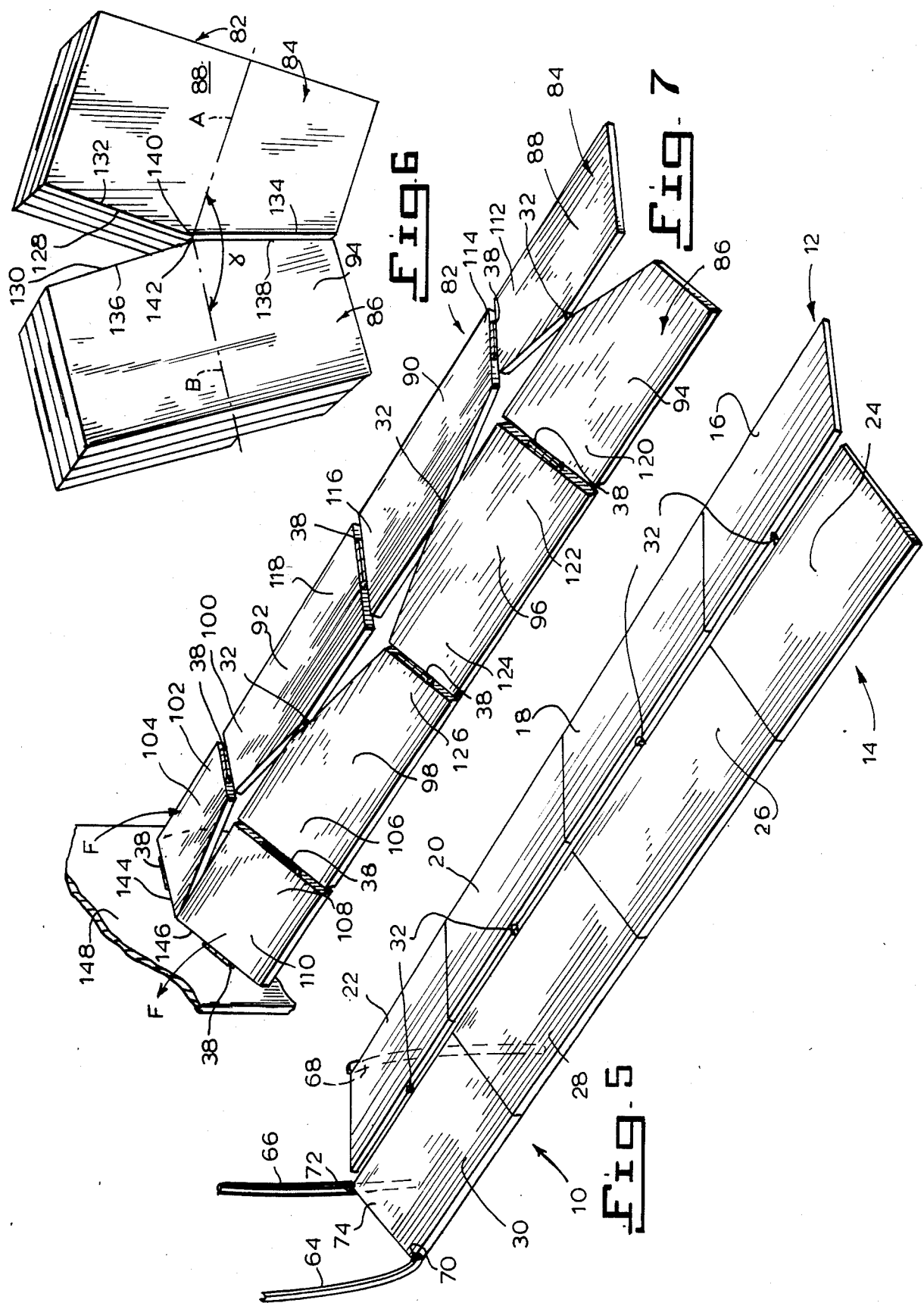

— 4,666,107 —

DEPLOYABLE SPACE PANEL STRUCTURE

BACKGROUND OF THE INVENTION

Deployable structures have found many uses in connection with space vehicles such as satellites and the like. Deployable structures are very useful in connection with space vehicles since they can be launched into space in their compact undeployed configuration and then later deployed when the space vehicle is located in its proper position in space. Indeed the proper performance of at least some space vehicles would be greatly hindered or prevented unless it had some sort of deployable structure. This is particularly true where the deployable structure is designed to provide power to the space vehicle.

Such deployable structures have taken many shapes. Some of these deployable structures have been formed from a single sheet of pre-stressed material that can be coiled into a compact configuration and then uncoiled to its deployed configuration to form a hollow tubular element that could be utilized for an antenna or the like. Another different and perhaps more important type of deployable space structure has incorporated a series of panels that can be deployed in space from a space vehicle. These types of deployable panel structures have many uses. For instance they can be utilized to supply power to this spacecraft by having the panels covered with an array of solar cells. They can also be utilized to reflect sunlight and the like or they can also be utilized to dissipate unwanted heat from the space vehicle. In most if not all instances the primary advantage of the deployable panel structure is its large surface area compared to its relatively low weight and its relatively compact volume when it is in its non-deployed configuration.

Deployable panel structures have been in use for some years in connection with space vehicles. For instance such deployable panel structures are set forth in U.S. Pat. Nos. 3,460,992; 3,525,483; 3,532,299; and 4,155,524. The deployable panel structures set forth in these patents are deployed and maintained in their deployed position by means of respectively a lazy tong linkage, a pair of cables, deployable booms, and cables and springs. In many instances it is desirable to have a relatively rigid deployable panel structure when it is deployed or in its deployed configuration. Unfortunately the invention set forth in these patents do not provide such a relatively rigid deployed panel structure. Moreover, for reliability's sake and for weight savings and the like, it is generally desirable to have as simple a structure as possible and to eliminate as much as possible any unnecessary structure other than the panels themselves. Unfortunately the invention set forth in these patents incorporate additional unwanted structure or structures.

The deployable space panel structure of this invention overcomes these problems associated with prior deployable panel structures and provides a deployable panel structure that is very rigid when it is in its deployed state. In addition, the deployable space panel structure of the invention utilizes only a minimal amount of structure that is not associated with the deployable panels themselves. Consequently, the invention saves weight and is highly reliable.

BRIEF DESCRIPTION OF THE INVENTION

This invention relates to deployable space structures and more particularly to a deployable space structure that utilizes a series of interconnected panels.

It is an object of the present invention to provide a deployable space panel structure that is very stiff or rigid when it is in its deployed state or configuration.

It is an object of the present invention to provide a deployable space panel structure that utilizes a minimal amount of structure other than the panels themselves.

It is also an object of the present invention to provide a deployable space panel structure that is highly reliable in operation.

It is also an object of the present invention to provide a deployable space panel structure that is easy to retract from its deployed configuration.

It is also an object of the present invention to provide a deployable space panel structure that is very compact when it is in its non-deployed configuration.

It is also an object of the present invention to provide a deployable space panel structure in which the location of these panels are precisely located in relation to the spacecraft or the like when the panels are in their deployed configuration.

It is also an object of the present invention to provide a deployable space panel structure wherein the deployable panels themselves are utilized to give the deployed panel structure its rigidity or stiffness.

The present invention provides a deployable space panel structure including a first series of interconnected panel members and a second series of interconnected panel members. Interconnecting means are also provided for interconnecting the first series of panel members and the second series of panel members and deploying means are also provided for deploying the first and second series of panel members. The deployable space panel structure is capable of being packaged in a compact non-deployed configuration and then being deployed to form a rigid panel structure. The deployable space panel structure is capable of providing a relatively large surface area when it is in its deployed configuration and yet it is capable of being packaged in a compact package in its non-deployed configuration.

BRIEF DESCRIPTION OF THE DRAWINGS

The invention will be hereinafter more fully described with reference to the accompanying drawings in which:

FIG. 1 is a perspective view of the deployable space panel structure of the present invention in its non-deployed configuration;

FIG. 2 is a perspective view of the structure illustrated in FIG. 1 illustrating a deployable space panel structure in its partially deployed configuration;

FIG. 3 is a perspective view of the structure illustrated in FIGS. 1 and 2 showing the deployable space panel structure in its further stage of deployment and also showing drive structure that is associated with the deployable space panel structure;

FIG. 4 is an end view of the deployable space panel structure set forth in FIG. 3 taken substantially on the line 4—4 thereof;

FIG. 5 is a perspective view of the deployable space panel structure illustrated in FIGS. 1 through 4 and also the drive members set forth in FIG. 3 showing a deployable space panel structure in its fully deployed configuration;

FIG. 6 is a perspective view of another embodiment of the deployable space panel structure of the present invention showing the deployable space panel structure in its non-deployed or collapsed configuration;

FIG. 7 is a perspective view of the structure set forth in FIG. 6 showing the deployable space panel structure in its fully deployed configuration;

DETAILED DESCRIPTION OF THE PREFERRED EMBODIMENTS

Figure 9:
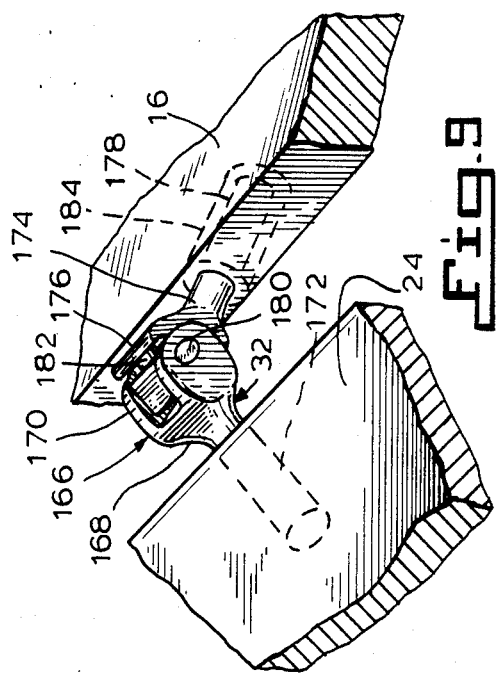
FIG. 9 is a perspective view of an alternative interconnecting member that can be utilized in place of the interconnecting member set forth in FIG. 8.

FIGS. 1, 2, 3, 4 and 5 illustrate one embodiment of the deployable space panel structure of the invention that is designated generally by the number 10. The deployable space panel structure 10 comprises a first series of interconnected, substantially flat, rectangular shaped panel members designated generally by the number 12 and a second series of interconnected, substantially similar, flat, rectangular shaped panel members that are designated generally by the number 14. The first series of interconnected panel members 12 comprises a plurality of substantially identical panel members designated by the numbers 16, 18, 20 and 22. In a similar manner the second series of interconnected panel members 14 comprises a plurality of substantially identical panel members that are designated by the numbers 24, 26, 28 and 30.

As best illustrated in FIGS. 2, 3, 4 and 5 the various panel members 16, 18, 20 and 22 of the first series of interconnected panel members 12 are rotatably interconnected with the respective panel members 24, 26, 28 and 30 of the second series of interconnected panel members 14 by interconnecting means that are designated generally by the number 32. The interconnecting means 32 will be hereinafter more fully described. Also as best illustrated in FIGS. 2, 3 and 5 the end portion 34 of the panel member 16 is rotatably connected to the adjacent end portion 36 of the panel member 18 by hinge means designated generally by the number 38. The opposite end portion 40 of the panel member 18 is also rotatably connected to the adjacent end portion 42 of the panel member 20 by similar hinge means 38. Also in a similar manner the opposite end portion 44 of the panel member 20 is rotatably connected to the adjacent end portion 46 of the panel member 22 by similar hinge means 38.

Also as illustrated in FIGS. 2, 3 and 5 the end portion 48 of the panel member 24 is rotatably connected to the adjacently located end portion 50 of the panel member 26 by similar hinge means 38. In a similar manner the end portion 52 of the panel member 26 is rotatably connected to the adjacently located end portion 54 by the hinge means 38, and the opposite end portion 56 of the panel member 28 is rotatably connected to the adjacently located end portion 58 of the panel member 30 by similar hinge means 38.

As illustrated in FIG. 3 the inner end portion designated by the number 60 of the deployable space panel structure 10 is connected to deploying means 62 for deploying the first series of panel members 12 and the second series of panel members 14. In the preferred embodiment this deploying means 62 comprises a series of deploying drive rails 64, 66 and 68. The deploying means 62 also includes slide members 70 and 72 that are located on the respective outer edges of the inner portion 74 of the panel member 30. These slide members cooperate and slide within the respective slide members 64 and 66. In addition, the deploying means 62 includes similar slide members 76 and 78 that are located on the respective edges of the inner end portion 80 of the panel member 22. These slide members 76 and 78 cooperate and slide within the respective slide members 66 and 68. The deploying means 62 itself is known to those skilled in the art.

As best illustrated in FIGS. 3 and 4 the respective panel members 16, 18, 20 and 22 of the first series of interconnected panel members 12 that are rotatably interconnected with the respective panel members 24, 26, 28 and 30 of the second series of interconnected panel members 14 form an angular relationship as the panel members 16, 18, 20 and 22 and the panel members 26, 28 and 30 are being deployed. This angular relationship results in an angle $\alpha$ when the series of interconnected panel members 12 and 14 are viewed from the end as illustrated in FIG. 4. This angular relationship results from the rotatable interconnecting means designated generally by the number 32 and the deploying means 62. As illustrated in FIG. 5 the interconnected series of panel members 12 and the series of panel members 14 continue to form an angular relationship with each other when they are in their fully-deployed position. The fact that the interconnected series of panel members 12 and the associated relationship with each other during and after deployment permits the deployable space panel structure 10 with its series of interconnected panel members 12 and 14 to maintain a fairly strong and stiff structure during and after deployment. Of course, the same would be true when the interconnected panel members 12 and 14 are being moved from their fully-deployed condition to their collapsed or stored configuration as illustrated in FIG. 1.

Another embodiment of the invention is illustrated in FIGS. 6 and 7 and is designated generally by the number 82. The embodiment 82 is substantially similar to the previously described embodiment 10; however, it utilizes a series of deployable panel members that are constructed in a different manner than the previously described panel members for the deployable space panel structure 10. In this connection the deployable space panel structure 82 comprises a first series of interconnected, substantially flat and generally rectangular-shaped panel members that are designated generally by the number 84 and a second series of interconnected substantially similar, flat, generally rectangular-shaped panel members that are designated generally by the number 86. The first series of interconnected panel members 84 comprises a plurality of substantially identical panel members designated by the numbers 88, 90 and 92. In a similar manner the second series of interconnected panel members 86 comprises a plurality of substantially identical panel members that are designated by the numbers 94, 96 and 98. It should be noted that the inner end portion 100 of the panel member 92 is rotatably connected by hinge means 38 to the inner end portion 102 of a similar panel member 104 that has substantially the shape and area of one half of the other panel members 88, 90 and 92 of the first series of panel members 84. In a similar manner the inner end portion 106 of the panel member 98 is rotatably connected by hinge means 38 to the inner end portion 108 of panel member 110 that is similar to the panel member 104 and has substantially the shape and area of one half of the other panel members 94, 96 and 98 of the series of panel members 86.

As illustrated in FIG. 7 the various panel members 88, 90 and 92 of the first series of interconnected panel members 84 are rotatably interconnected with the respective panel members 94, 96 and 98 of the second series of interconnected panel members 86 by means of the interconnecting means 32. Also the end portion 112 of the panel member 88 is rotatably connected to the adjacent end portion 114 of the panel member 90 by hinge means designated generally by the number 38. In a similar manner the opposite end portion 116 is rotatably connected to the end portion 118 of the panel member 92 by similar hinge means 38. In a similar manner the inner end portion 120 of the panel member 94 of the adjacent series of panel members 86 is rotatably connected to the adjacent end portion 122 of the panel member 96 by hinge means 38. Also, the opposite end portion 124 of the panel member 96 is rotatably connected to the adjacent end portion 126 of the panel member 98 by hinge means 38.

As best illustrated in FIG. 6 for the panel members 88 and 94 the respective inner edges 128 and 130 of the panel members 88 and 94 have respective sloping edge portions 132 and 134 and 136 and 138 that slope inward toward the respective points 140 and 142. This results in the edge portions 132 and 134 of the panel member 88 making an angle with each other and in the edge portions 136 and 138 of the panel member 94 making a similar angle with each other. The other panel members 90 and 92 of the first series of panel members 84 have substantially identical sloping inner edge portions, and the associated inner panel member 104 has a single sloping edge portion that has substantially the same slope and angular relationship as the sloping edge portions 132 and 134 for the panel member 88. In a similar manner the other panel members 96 and 98 of the second series of panel members 86 have substantially the same sloping edge portions and angular relationships as the edge portions 136 and 138 of the panel member 94. In addition, the inner panel member 110 has a sloping inner edge portion that is similar to the sloping edge portion of the panel member 104.

As illustrated in FIG. 6 the center line A of the panel member 88 and the center line B of the panel member 94 that pass through the respective points 140 and 142 making an angle $\gamma$ with each other and the respective center lines of the other panel members 90 and 92 of the first series of panel members 84 and the center line of the panel members 96 and 98 of the second series of panel members 86 also make a similar angle $\gamma$ with each other. As illustrated in FIG. 7, the inner end portion 144 of the panel member 104 and the inner end portion 146 of the panel member 110 are rotatably connected to a rigid member designated by the number 148 by the hinge means 38. These inner end portions 144 and 146 are connected to the rigid member 148 in such a manner that the inner edges 144 and 146 make the same angle $\gamma$ with each other. In view of the arrangement of the first series of panel members 84 and the second series of panel members 86 of the deployable space panel structure 82 the centerlines, such as the centerlines A and B for the panel members 88 and 94, maintain their same angular relationship $\gamma$ with each other as the first and second series of panel members 88 and 94 are deployed to their extended configuration or retracted to their collapsed configuration. In addition, as the first series of panel members 84 and the second series of panel members 86 are being deployed or retracted, the center lines, such as the center lines A and B for the panel members 88 and 94, remain in substantially the same plane. The fact that the first and second series of panel members 84 and 86 maintain the angular relationship $\gamma$ between center lines of the panel members during deployment, retraction and in their deployed state means that the interconnected series of panel members 84 and 86 provide a rigid structure not only in the deployed state but also as they are being deployed or retracted.

It should be noted that the sloping inner edge portions, such as the edge portions 132 and 134 of the panel member 88 and the sloping inner edge portions 136 and 138 of the panel member 94, permit the interconnected first and second series of panel members 84 and 86 to be readily deployed and retracted without having any binding or interference between the inner edges of the panel members in the series of the deployable panel members 84 and 86. The deployment of the interconnected first and second series of panel members 84 and 86 can be accomplished by various means known to those skilled in the art; however, commonly, such means would exert a force on one or both of the panel members 104 and 110 such as the Force F illustrated in FIG. 7 that is being exerted against the panel member 104. It will be appreciated that the hinge means 38 can take various forms that are known to those skilled in the art.

Figure 10:
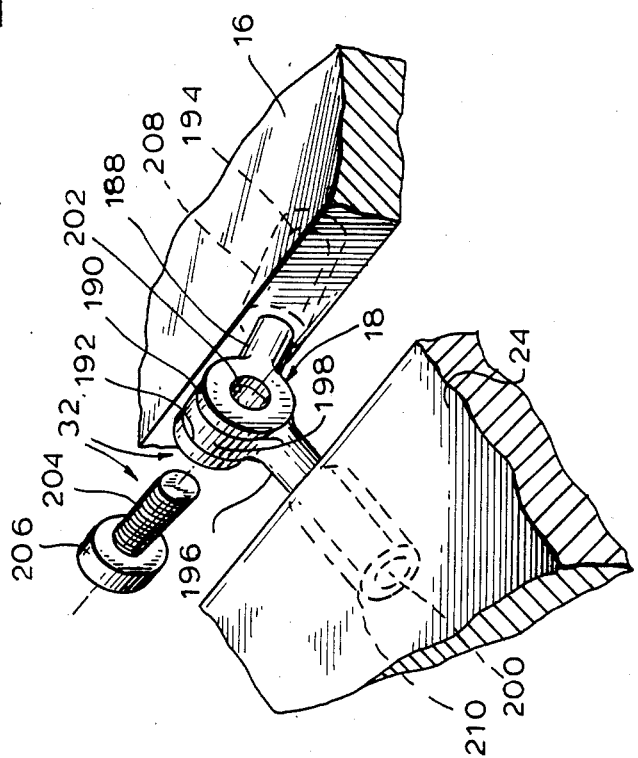
FIG. 10 is a perspective view of an additional interconnecting member that can be used in place of the interconnecting members set forth in FIGS. 8 and 9.
Figure 8:
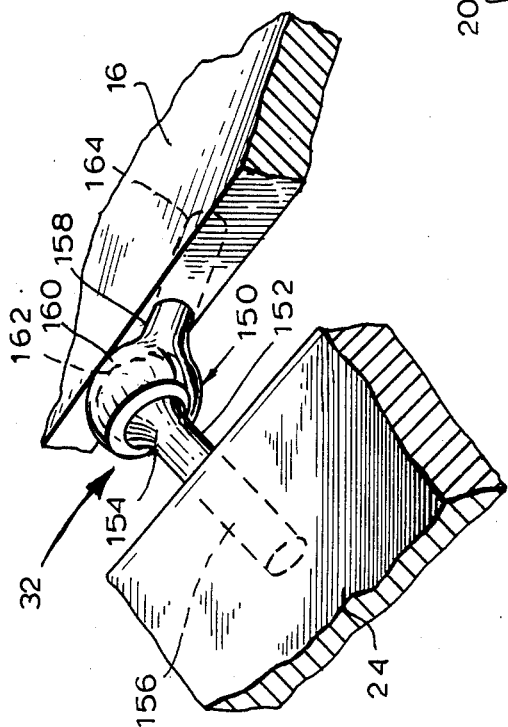
FIG. 8 is a perspective view of an interconnecting member that interconnects one series of interconnected panel members with another series of interconnected panel members that can be utilized with the deployable space panel structure set forth in FIGS. 1 through 7.

Some of the various types of interconnecting means 32 that can be utilized with the various panel members of the deployable space panel structure 10 illustrated in FIGS. 1 through 5 and the deployable space panel structure 82 illustrated in FIGS. 6 and 7 are illustrated in FIGS. 8 through 10. It should be noted for convenience that the interconnecting means 32 is illustrated in FIGS. 8 through 10 as being connected to the panel members 16 and 24. However, it should be understood that the same structure that forms the inner connecting means 32 would also be used to interconnect the other previously-described interconnected panel members.

In FIG. 8 the interconnecting means 32 comprises ball joint apparatus 150 that comprises a ball member 152 that has an outer enlarged, substantially ball-shaped head portion 154 and an integral shank portion 156 that is rigidly connected to the inner edge of the panel member 24. The ball joint apparatus 150 also comprises a socket member 158 that has an enlarged outer socket portion 160 that has a socket 162 that is sized and shaped to slideably receive the outer head portion 154. The socket member 158 also has an integral shank portion 164 that is rigidly secured to the inner edge of the panel member 16. In view of this arrangement, the ball joint apparatus 150 permits complete rotational freedom of movement between the inner edge portions of the panel members 16 and 24.

In FIG. 9 the interconnecting means 32 comprises universal joint apparatus 166 that comprises a universal joint member 168 that has an enlarged U-shaped head portion 170 and an integral shank portion 172 that is rigidly connected to the inner edge of the panel member 24. The U-joint apparatus 166 also comprises another U-joint member 174 that has an enlarged outer U- shaped end portion 176 and an integral, cylindrical-shaped shank portion 178. The outer U-shaped end portions 170 and 176 are interconnected by the pins 180 and 182 in a manner known to those skilled in the art. The shank portion 178 of the U-joint member 174 also is free to rotate within the bushing 184 that is rigidly connected to the inner edge portion of the panel member 16. In view of this arrangement of the U-joint apparatus 166, substantially the same degree of movement is available between the inner edge portions of the panel members 16 and 24 as with the embodiment of the interconnecting means 32 that is set forth in FIG. 8.

In FIG. 10 the interconnecting means 32 comprises the hinge pivot apparatus 186. The hinge pivot apparatus 186 comprises a hinge member 188 that has an enlarged outer U-shaped portion 190 with a slot 192 and an integral, cylindrical shank portion 194. The hinge pivot apparatus 186 also comprises a hinge member 196 that has an enlarged head portion 198 that fits within the slot 192. The hinge member 196 also has a cylindrical shank portion 200. The head portions 190 and 198 also have apertures such as the aperture 202 for receiving the shank portion 204 of a bolt member 206 or the like so that the outer end portions 190 and 198 are pivotally interconnected. The cylindrical shank portions 194 and 200 are rotatably mounted within the respective bushings 208 and 210 that are rigidly located within the respective inner edge portions of the panel members 16 and 24. In view of this arrangement of the hinge pivot apparatus 186, almost the same degree of movement is available between the inner edge portions of the panels 16 and 24 as is available in the embodiments of the interconnecting means 32 illustrated in FIGS. 8 and 9.

The deployable space panel structures 10 and 82 are manufactured and used in the following manner. The various panel members 16, 18, 20 and 22 of the first series of interconnected panel members 12 are manufactured from a suitable material such as a light weight honeycomb structure that is known to those skilled in the art. In a similar manner the various panel members 24, 26, 28 and 30 of the second series of interconnected panel members 14 are manufactured from a similar type of honeycomb material that is known to those skilled in the art. These various panel members are then interconnected using the interconnecting means 32 in the manner illustrated in FIGS. 3 and 5. The deploying means 62 is then manufactured from suitable stock such as aluminum channel members to form a series of deploying drive rails 64, 66 and 68 as indicated in FIGS. 3 and 5 the drive rail 64, 66 and 68 are formed so that the first series of panel members 12 and the second series of panel members 14 make an angle with each other as they are being deployed and when they are in their fully deployed state. This is necessary to insure that the deploying and deployed panel members of the first and second series 12 and 14 have strength. After the deploying means 62 has been formed, slide members 70, 72, 76 and 78 are located on the respective outer edges of the inner portion 74 of the panel member 30 and the respective outer edges of the inner end portion 80 of the panel member 22. These slide members 70, 72, 76 and 78 are then located so that they slide within the respective drive rails 64, 66 and 68 and as a result the first and second series of interconnected panel members 12 and 14 are connected to the deploying means 62. The actual deployment of the interconnected panel members 12 and 14 is accomplished by causing the slide members 70, 72, 76 and 78 to move along the respective drive rails 64, 66, 66 and 68 by means known to those skilled in the art such as by applying force to the panel members 30 and 22. It should be noted that in the preferred embodyment it is desirable to have the outermost panel members such as panel member 16 and 24 of the respective interconnected deployable panel members 12 and 14 deploy at least slightly before the innermost panel members 22 and 30.

The deployable space panel structure 82 is manufactured in a manner similar to the deployable space panel structure 10. In this connection the panel members 88, 90, 92 and 104 of the first series of interconnected panel members 84 and the panel members 94, 96, 98 and 110 of the second series of interconnected panel members 86 may be manufactured from a similar type of lightweight honeycomb material by means known to those skilled in the art. The first series of interconnected panel members 84 is then connected to the second series of interconnected panel members 86 by means of the inner connecting means 32 as illustrated in FIG. 7. As illustrated in FIG. 7 the inner end portion 144 of the panel member 104 and the inner end portion 146 of the panel member 110 are rotatably connected to a rigid member designated by the number 148 by the hinge means 38 that are known to those skilled in the art. As indicated a downward force F up on the upper surface of the panel member 104 can result in deployment of the first and second interconnected series of panel members 84 and 86 in a similar manner an upward force F upon the panel member on 110 can result in the retraction of the interconnected series of panel members 84 and 86. It should be noted that the first and second series of interconnected panel members 84 and 86 make an angle with each other when they are in their deployed state and also as they are being deployed or retracted. This of course is a necessary so that the interconnected series of panel members 84 and 86 have strength. As indicated for the deployable space panel structure 10 it is desirable to have the outer panel members deploy slightly before the inner panel members and that is also true for the deployable space panel structure 82. Consequently the panel members 88 and 94 should be deployed before the inner panel members 104 and 110.

In using the deployable space panel structures 10 and 82 they are normally stored within a space vehicle or the like (not shown) in their stored or collapsed configuration. Then when the space vehicle reaches its designated location in space the first and second series of interconnected panel members such as the interconnected panel members 12 and 14 or the deployable space panel structure 10 the interconnected panel members 84 and 86 for the deployable space panel structure 82 are then deployed in the manner previously indicated. Should it be deemed desirable these series of interconnected panel members 12 and 14 and 84 and 86 can then be retracted into their stored position as indicated in the respective FIGS. 1 and 6. It will of course be appreciated that the deployable panel members 16, 18, 20, 22, 24, 26, 28 and 30 of the deployable space panel structure 10 and the panel members 88, 90, 92, 104 94, 96, 98 and 110 of the deployable space panel structure 82 can have solar cells (not shown) located on them so as to provide power to the space vehicle or the like.

Although the invention has been described in considerable detail with reference to certain preferred embodiments, it will be understood that variations or modifications may be made within the spirit and scope of the invention as defined in the appended claims.

What is claimed is:

1. Deployable space panel structure comprising a first series of interconnected panel members and a second series of interconnected panel members, said first series of panel members and said second series of panel members being locateable in different planes when said first series of panel members and said second series of panel members are deployed; interconecting means for interconnecting said first and said second series of panel members, said interconnecting means interconnecting the edge portions of at least some of the panel members in the first series of panel members with the edge portions of at least some of the panel members in the second series of panel members and comprising means for adding rigidity to said first series of panel members and said second series of panel members when said first series of panel members and said second series of panel members are deployed, said means for adding rigidity comprising means for permitting the deployed first series of interconnected panel members and the deployed second series of interconnected panel members to form an angle of other than 180° with each other; and means associated with said first and said second series of panel members for deploying said first and said second series of panel members.

2. The deployable space panel structure of claim 1 wherein said means for adding rigidity to said first series of panel members and said second series of panel members also comprises means for maintaining said first series of panel members and said second series of panel members as a stiff structure as said first and said second series of panel members are being deployed.

3. The deployable space panel structure of claim 2 wherein said means for adding rigidity to said first series of panel members and said second series of panel members also comprises at least a portion of said means for deploying said first and said second series of panel members.

4. The deployable space panel structure of claim 2 wherein said first series and said second series of panel members have an end and wherein said means for adding rigidity includes the respective panel members of said first series of panel members and said second series of panel members forming an angular relationship of other than 180° as viewed from the end as the panel members of said first series and said second series of panel members are being deployed.

5. The deployable space panel structure of claim 4 wherein said means for adding rigidity to said first series of panel members and said second series of panel members also comprises means for maintaining said first series of panel members and said second series of panel members as a stiff structure as said first and said second series of panel members are being moved from the deployed to the stored configuration.

6. The deployable space panel structure of claim 5 wherein said means for maintaining said first and second series of panel members as a stiff structure as said first and second series of panel members are being moved from the deployed to the stored configuration comprises means for maintaining the other than 180° angular relationship between the respective panel members of said first and said second series of panel members as said first and second series of panel members are being moved from the deployed to the stored configuration.

7. The deployable space panel structure of claim 6 wherein the panel members of said first series of panel members and said second series of panel members have means for permitting said first and said second series of panel members to be deployed and retracted without having any binding or interference between the panel members.

8. The deployable space panel structure of claim 7 wherein the panel members of said first and said second series of panel members have inner edges and wherein said means for permitting deployment and retraction without binding or interference comprises panel members with sloping inner edge portions.

9. The deployable space panel structure of claim 4 wherein said interconnecting means comprise means for permitting rotational movement between the interconnected panel members.

10. The deployable space panel structure of claim 9 wherein said interconnecting means comprises a ball joint assembly.

11. The deployable space panel structure of claim 9 wherein said interconnecting means comprises a combination hinge and pivot assembly.

12. The deployable space panel structure of claim 9 wherein said interconnecting means comprises a u-joint assembly.

* * * * *